(12) United States Patent
Dion et al.

(10) Patent No.: US 8,875,157 B2
(45) Date of Patent: Oct. 28, 2014

(54) DEPLOYMENT OF PRE-SCHEDULED TASKS IN CLUSTERS

(75) Inventors: David A. Dion, Bothell, WA (US); Lokesh S Koppolu, Redmond, WA (US); Symon Perriman, Seattle, WA (US); Zongwei Sun, Redmond, WA (US); Mykyta Synytskyy, Bellevue, WA (US); Maksym Yanchenko, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 13/229,431

(22) Filed: Sep. 9, 2011

(65) Prior Publication Data
US 2013/0067493 A1 Mar. 14, 2013

(51) Int. Cl.
G06F 3/00 (2006.01)
G06F 9/44 (2006.01)
G06F 9/46 (2006.01)
G06F 13/00 (2006.01)
G06F 9/48 (2006.01)

(52) U.S. Cl.
CPC .................. G06F 9/4843 (2013.01)
USPC ....................................................... 719/318

(58) Field of Classification Search
None
See application file for complete search history.

(56) References Cited

U.S. PATENT DOCUMENTS

| | | | |
|---|---|---|---|
| 7,433,931 B2 * | 10/2008 | Richoux | 709/217 |
| 7,434,041 B2 | 10/2008 | Srivastava et al. | |
| 7,656,818 B1 * | 2/2010 | Baroudi et al. | 370/254 |
| 7,865,888 B1 | 1/2011 | Qureshi et al. | |
| 7,917,574 B2 | 3/2011 | Liu | |
| 8,261,275 B2 * | 9/2012 | Johnson et al. | 718/102 |
| 2003/0126283 A1 * | 7/2003 | Prakash et al. | 709/238 |
| 2003/0204582 A1 * | 10/2003 | Shimoda et al. | 709/223 |
| 2010/0058433 A1 * | 3/2010 | Szabo | 726/1 |
| 2010/0083253 A1 * | 4/2010 | Kushwaha | 718/100 |

OTHER PUBLICATIONS

Albrecht, et al., "Remote Control: Distributed Application Configuration, Management, and Visualization with Plush", In Proceedings of the 21st Conference on Large Installation System Administration, Nov. 11-16, 2007, pp. 183-201.
"Running the Same Schedulable Service on Multiple Servers", Retrieved on: Aug. 19, 2011, Available at: http://download.oracle.com/docs/cd/E23507_01/Platform.20073/ATGProgGuide/html/s0905runningthesameschedulableservice01.html.
Nurmi, et al., "The Eucalyptus Open-source Cloud-computing System", In Proceedings of the 9th IEEE/ACM International Symposium on Cluster Computing and the Grid, 2009, 8 pages.
McNett et al., "Usher: An Extensible Framework for Managing Clusters of Virtual Machines", In Proceedings of the 21st Conference on Large Installation System Administration, Nov. 11-16, 2007, pp. 167-181.

* cited by examiner

*Primary Examiner* — Emerson Puente
*Assistant Examiner* — Kacy Verdi
(74) *Attorney, Agent, or Firm* — Henry Garbryjelski; Doug Barker; Micky Minhas

(57) ABSTRACT

A method of managing a triggerable task in a cluster environment is described. The method includes accessing a definition of a task, wherein the definition includes a triggering event, and an action to be performed when the triggering event occurs. The method further includes, accessing a cluster policy defining how triggering events are interpreted on a node task basis for a plurality of nodes in a cluster. Based on the cluster policy, the method includes determining that the triggering event has occurred. As a result of the determination that the triggering event has occurred, the method further includes attempting to perform the action.

20 Claims, 4 Drawing Sheets

DEPLOYMENT OF PRE-SCHEDULED TASKS IN CLUSTERS

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing system's ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Computing systems could be interconnected to form a cluster with the computing systems acting as nodes in the cluster. For example, to ensure high availability of applications, it is common to host them in a distributed, multiple computer system (i.e. a cluster).

Currently there are ways to configure triggerable tasks to run on a stand-alone computer (for example using the Windows Task Scheduler available in the Windows operating systems available from Microsoft Corporation of Redmond Wash.). The tasks can be set to be executed on various triggers, such as at pre-determined times of the day or to be executed when certain other triggers happen on the computer. For example, a system can be configured to run the task whenever a user logs into the computer. However, this architecture does not extend to clusters, where computers can be dynamically added to or removed from the cluster.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of managing a triggerable task in a cluster environment. The method includes accessing a definition of a task, wherein the definition includes a triggering event, and an action to be performed when the triggering event occurs. The method further includes, accessing a cluster policy defining how triggering events are interpreted on a node/task basis for a plurality of nodes in a cluster. Based on the cluster policy, the method includes determining that the triggering event has occurred. As a result of the determination that the triggering event has occurred, the method further includes attempting to perform the action.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments allow triggerable tasks to be run on clusters, where computers can be dynamically added to or removed from the clusters. A cluster task policy can be consulted to determine how triggerable tasks should be performed in a cluster with respect to the different nodes in the cluster and how triggers should be handled in the cluster environment. Cluster deployed triggerable tasks may automatically get configured (or removed) from these computers that are added (or removed) from the cluster. Embodiments may provide a mechanism to easily deploy these clustered triggerable tasks.

Figure 1:
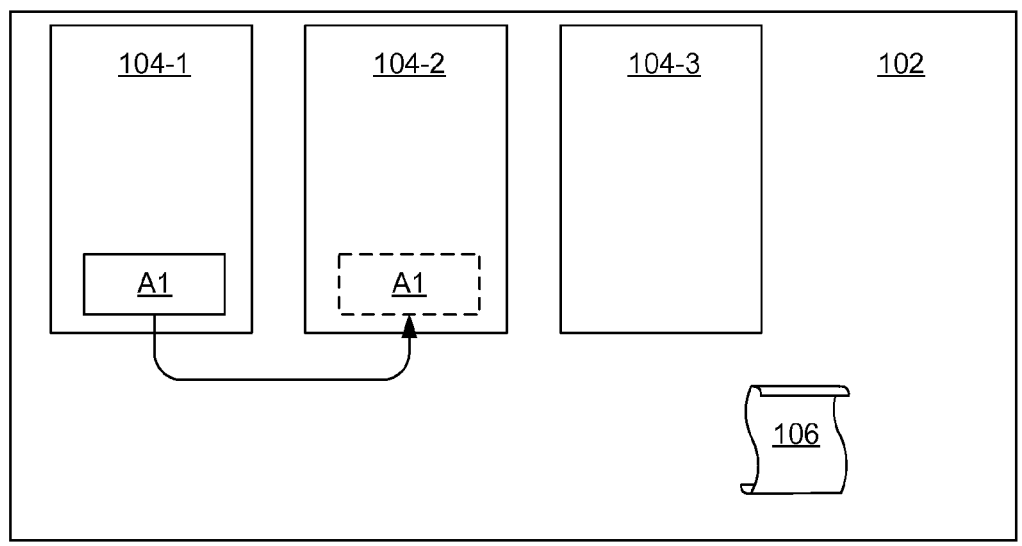
FIG. 1 illustrates a computing cluster.

Referring now to FIG. 1, an example cluster 102 is illustrated. The cluster 102 includes a plurality of nodes. In the example illustrated in FIG. 1, nodes 104-1, 104-2, and 104-3 are illustrated. However, it should be appreciated that any appropriate number of nodes may be included in the cluster 102. Nodes may be referred to herein generically as node 104. A triggerable task 106 may be applied to the cluster 102.

Embodiments may be implemented to allow for different execution semantics for clustered triggerable tasks, such as triggerable task 106. For example, embodiments may be configured to run the triggerable task on all nodes 104 that are part of the cluster. For example, a triggerable task may be configured to do some file server related maintenance on all computers in the cluster.

In another example, embodiments may have functionality to ensure that the triggerable task 106 is run on only one node 104, where the node 104 chosen can be any one of the different nodes 104 that are part of the cluster. For example, embodiments may be configured to run a cluster anti-virus patching orchestrator on one node 104 of the cluster 102 every day at a specific time.

In another example, embodiments may have functionality to run the triggerable task 106 on only the node 104 where a specified application is hosted. If the application is moved to another computer, then the triggerable task 106 should be activated on the new host. For example, if a particular application A1 is running on the node 104-1, the triggerable task 106 may be run on or against the node 104-1. If the particular application is moved to node 104-2, the task 106 may cease to be run on or against the node 104-1 and instead be run on or against the node 104-2.

An administrator may wish to configure events as triggers for executing a triggerable task, where the events are associated with the state of an application hosted in the cluster. For example, embodiments trigger a triggerable task when the state of the application goes to 'Failed'.

Embodiments may provide run at most once, and/or run at least once guarantees. For example, if a triggerable task 106 is triggered to be executed at 3 PM every day on a node 104-1 where application A1 is running, and the application is moved over to another node 104-2 at 3:01 PM before the triggerable task could complete, then a 'run at most once' guarantee would require that the triggerable task 106 is not triggered again. However, a 'run at least once' guarantee would require that the triggerable task 106 be run again on the new host node 104-2 if the triggerable task 106 is not marked as successfully run.

Embodiments may be implemented where if a triggerable task associated with an application fails to run on a computer, higher reliability can be provided for the triggerable task by moving the associated application to a different computer and rerunning the triggerable task there.

Embodiments may provide a mechanism to easily configure such triggerable tasks. Embodiments may include functionality for associating triggerable tasks with applications (and optionally their states). Embodiments may include functionality for specifying which nodes (any one or all or the nodes hosting an application) where a triggerable task can be executed. Embodiments, may provide a run 'at most once' and/or 'at least once' guarantee.

The following summarizes a number of aspects with respect to triggerable tasks in a multi-computer cluster system that may be illustrated further below. Embodiments may implement a framework for configuration and execution of triggerable tasks. Embodiments may implement various semantics, such as run on any one computer, run on all computers, and/or run on the computer hosting a particular application.

Embodiments may include functionality for automatic configuration of triggerable tasks on new computers that become part of the cluster, and/or automatic deactivation of triggerable tasks on computers that lose membership from the cluster. Embodiments may include functionality for association of triggerable tasks with state change of an application or some other state change or event in the cluster. Embodiments may include a mechanism to provide guarantees of 'run at most once' or 'run at least once'. Embodiments may be configured to provide higher reliability to failed triggerable tasks by moving application(s) associated with a triggerable task to a different node and rerunning the triggerable task on it.

Standalone task schedulers (for example the Windows Task Scheduler available from Microsoft Corporation of Redmond Washington) have been widely used by administrators to manage triggerable tasks for computers. However, triggerable tasks may have different semantics and execution guarantee requirements when run in a distributed multiple computer system (i.e., a cluster). Some embodiments enable administrators to deploy triggerable tasks tailored to cluster systems enabling cluster management in a simple, reliable way by using triggerable tasks in a cluster, for example, such as to schedule cluster-aware triggerable tasks to send email notifications upon certain cluster events, generate periodical cluster reports, or conduct periodical maintenance tasks (i.e. chkdsk, storage backups, security updates, etc).

As illustrated in some embodiments herein, a task scheduler is a component of an operating system (or some other stand-alone application) that provides the ability to schedule the launch of programs or scripts on certain triggers, such as at pre-defined times or after specified time intervals, or when certain events happen on a computer. A triggerable task 106 is defined as the programs or scripts that are pre-defined to be run by the task scheduler. A cluster 102 is a distributed computing system which hosts multiple applications.

A node 104 is a computer system that is considered to be an active member of the cluster 102. An inactive-node is a computer that was part of the cluster, but currently is not an active member. This may be due to the clustering service not running on that computer.

A cluster triggerable task is a triggerable task registered to run on all or some nodes of a cluster. In the examples illustrated herein, there are three types of cluster triggerable tasks: a) application triggerable task, b) single-node triggerable task and c) cluster-wide triggerable tasks. An application triggerable task is a triggerable task that is associated with an application hosted in a cluster. The triggerable task will be executed on the node(s) hosting the application. A single-node triggerable task is a triggerable task that can be executed on any node in the cluster, but only needs to be executed on one such node. A cluster-wide triggerable task is a triggerable task that will be executed independently on all nodes of the cluster.

Triggerable task status data is data about when the triggerable task was last attempted to be run and when it last ran successfully.

Figure 2:
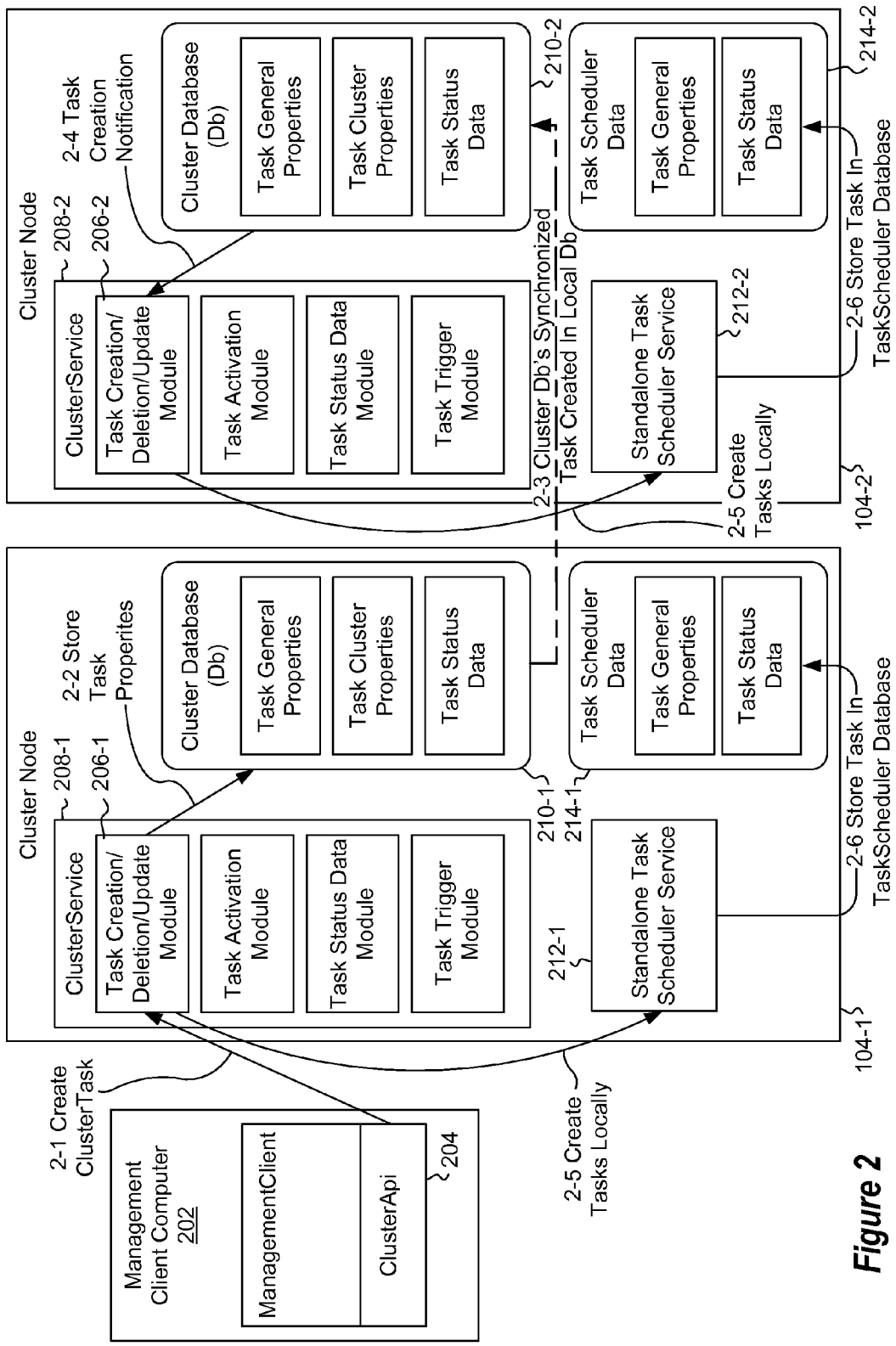
FIG. 2 illustrates task management on nodes in a cluster.

Referring now to FIG. 2, an architecture for clustered triggerable tasks is shown. FIG. 2 illustrates an architecture for creating a triggerable task in a cluster. A management client computer 202 calls the APIs supported by the ClusterApi 204 to initiate creation of the triggerable task in the cluster as illustrated at 2-1. The triggerable task creation module 206-1 (although task creation modules may be referred to generally as 206, but referred to specifically at 206-1 and 206-2) in the cluster service 208-1 (although the cluster service may be referred to generally as 208, but referred to specifically at 208-1 and 208-2) validates the triggerable task properties and then adds the task properties to a cluster database 210-1 (although cluster databases may be referred to herein generically as 210 with specific examples shown and 210-1 and 210-2) as illustrated at 2-2. Cluster database synchronization, as illustrated at 2-3, ensures that all cluster nodes get notifications as illustrated at 2-4, for the triggerable task being created. As illustrated at 2-5, the cluster service on each node (in the example illustrated, cluster services 208-1 and 208-2 on node 104-1 and 104-2) then creates the triggerable task in the local standalone task scheduler service 212-1 and 212-2 respectively. In some embodiments, the triggerable tasks are created in a disabled state. As illustrated at 2-6 in FIG. 2, the triggerable task is stored in a task scheduler database 214-1 and 214-2 respectively.

Figure 3:
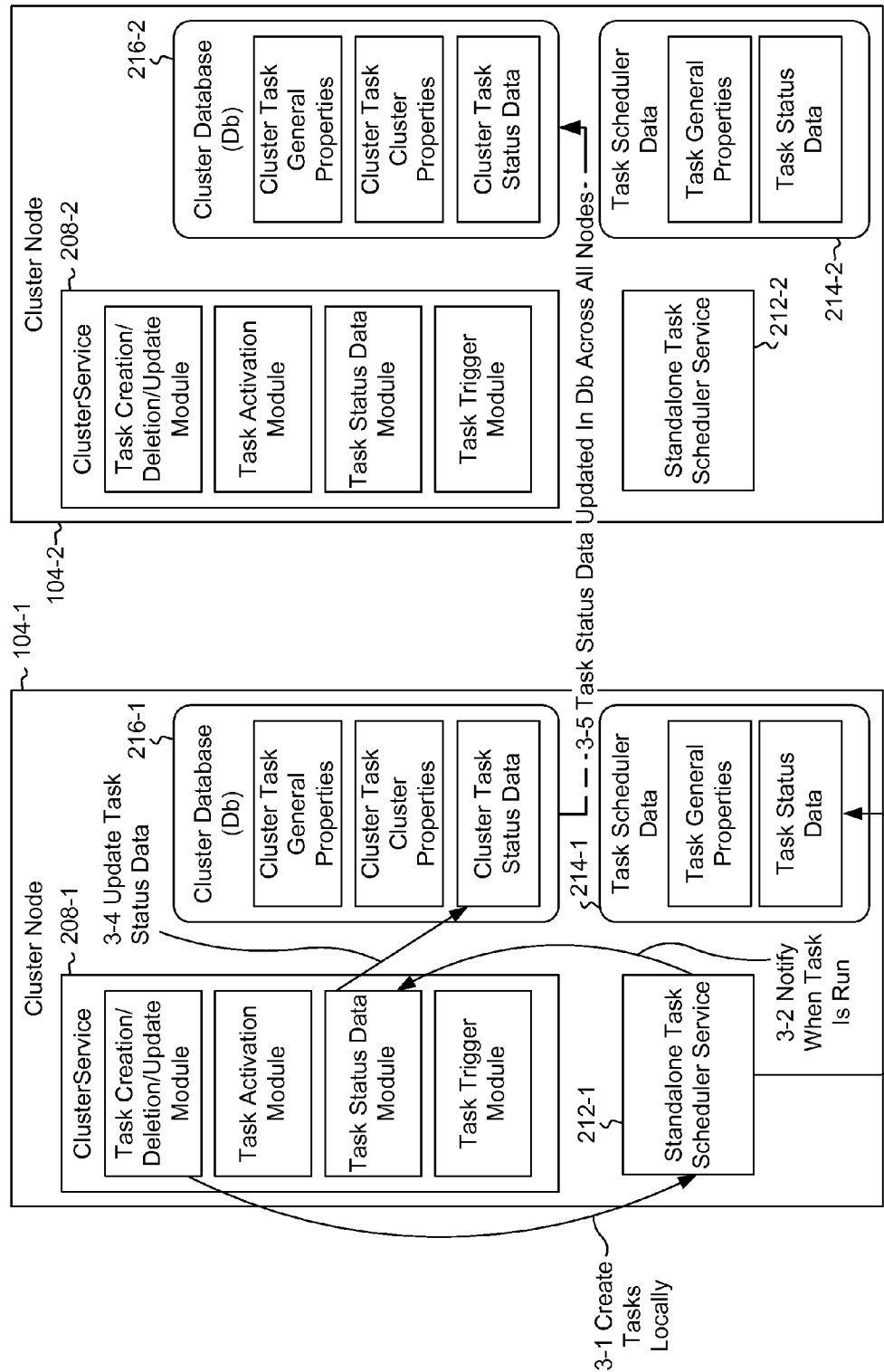
FIG. 3 illustrates additional details of task management on nodes in a cluster.

Reference is now made to FIG. 3, which shows activation and execution of triggerable tasks. Triggerable tasks are activated on appropriate nodes as needed, as illustrated at 3-1. For example, triggerable tasks may be activated on all nodes for cluster wide triggerable tasks, or only on the node hosting a particular application for application specific triggerable tasks. When a triggerable task is run, as illustrated at 3-2, a notification of the result of the execution is sent to the cluster service 208-1. As illustrated at 3-4 the cluster service 208-1 stores the task status data in the cluster database 216-1. The cluster database is replicated across all nodes in a consistent way as illustrated at 3-5.

For some triggerable tasks tied to an application, application state change can be used as a trigger. A task-trigger module can trigger a task scheduler service whenever the application reaches appropriate state on a local node.

Nodes may be added to a cluster. In particular, in some embodiments, a new node may be added dynamically to a cluster. In some embodiments, when a new node is added to a cluster, the database synchronization that takes place during the 'join' protocol, ensures that the local cluster database 210 is synchronized automatically with the other nodes. Once the local cluster database 210 is synchronized, the cluster service 208 creates and activates any triggerable tasks.

The cluster service 208 may be stopped or started on a node. When the cluster service 208 is stopped (or crashes) on a node, the task scheduler service 212 can detect that and disable all triggerable tasks locally. In an alternative embodiment, the task scheduler 212 can choose to verify that the cluster service 208 is running and an active member of the cluster before attempting to run any cluster triggerable tasks. This ensures that if a node is not an active part of the cluster, then the clustered triggerable tasks will automatically not be run.

When a cluster service 208 starts (for example because a node was rebooted), the cluster database 210 may be automatically synchronized. As such the node 104 having the started cluster service 208 gets the updated triggerable tasks and in turn updates the cluster triggerable tasks with the local task scheduler service 212.

Embodiments may include removing a node 104 from a cluster 102. When a node 104 is removed from a cluster 102, the cluster service 208 is notified of the node 104 being removed and deletes all the cluster triggerable tasks.

If a node 104 is removed from a cluster 102 without the cluster service 208 being notified, the cluster service 208, when it starts up detects that the local node 104 has been removed and deletes all state with respect to the cluster 102.

Various types of clustered triggerable tasks may be implemented. Among these are cluster-wide triggerable tasks, single-node triggerable tasks, and application triggerable tasks.

A cluster wide triggerable task is activated on all nodes of the cluster.

In some embodiments, for a single-node triggerable task, the cluster service runs a distributed algorithm to ensure that one of the nodes is picked up as the 'task scheduler director'. The task scheduler director ensures that there is at least one, and in some embodiments, only one such node. The task scheduler director node activates all single-node triggerable tasks on the local node. Using a leader-clone mechanism, The task scheduler director node can ensure that if a triggerable task fails to run locally, it is re-run on a different node if required. In alternative embodiments, implementations could choose a different mechanism. For example, each cluster triggerable task could be considered to be similar to an application hosted in the cluster. The underlying framework ensures that the application is run on only one node and that on failure it is hosted on a different node. The same framework could be used to ensure failover of cluster triggerable tasks.

The following illustrates examples related to application-triggerable tasks. Triggerable tasks associated with applications are activated on the node where the application is currently hosted. In some embodiments, if it is an application-state triggered task, then a task-trigger module gets notified for all application state changes. When the appropriate state change takes place, the task-trigger module calls the task scheduler API to trigger execution of the triggerable task. If the application-triggerable task fails to run on a node, the application can be moved to a different node and the triggerable task can be rerun there. If a triggerable task does not perform properly, its state can be preserved in a database, such as the cluster database 210. Illustratively if portions of a task have been performed, then those portions can be noted. In some situations, those portions may not need to be re-performed, but rather only those portions of the task that have not been performed may need to be performed.

If the application is moved to a different node (for example, due to administrator action, or due to application failure), the triggerable task may also be automatically moved to the other node. Based on the triggerable task property, if the triggerable task is already running on the previous node, either the triggerable task could be allowed to continue to run, or could be stopped and retried on the new node.

As noted previously, embodiments may include 'run at most once' guarantees. In some embodiments, for triggerable tasks that need 'run at most once' guarantees, the triggerable task will not be retried if the triggerable task status-data indicates that the triggerable task was started after the trigger was fired. The triggerable task status-data is automatically synchronized across all nodes 104 of the cluster 102. The triggerable task start time, the number of retries, and the result of running the triggerable task may all committed to the cluster database 210 which is replicated across the nodes 104 in the cluster 102. Hence if a triggerable task is run on a node which then crashes, the new node owning that triggerable task reads the database 210 and is aware that the triggerable task started based on its start time in the triggerable task status-data.

As noted previously, embodiments may include 'run at least once' guarantees. For triggerable tasks that need 'run at least once' guarantee, the triggerable task can be retried locally and on different nodes till a successful run of the triggerable task is recorded in the cluster database.

The following illustrate a number of pseudo code APIs that may be used by a cluster service. A management client calls the APIs supported by cluster api 204 to create, change, query or delete cluster triggerable tasks. The following pseudo functions are listed to demonstrate what parameters may be used to call cluster APIs.

RegisterClusterTriggerable task( ) function

This function will create or change a cluster triggerable task.

---

HRESULT RegisterClusterTriggerable task( [in] LPCWSTR ClusterName,
    [in] LPCWSTR triggerable taskname,
    [in] ClusterTriggerable taskType, // AllNodes or AnyNode
    [in] BOOL   localSystem, // if runs as local system account.
    [in] LPCWSTR applicationName, //optional application associated with task
    [in] BOOL   onlineOnly, // triggerable task only runs when associated application is online.
    [in] RegistrationType registrationType, // create or change
    [in] LPCWSTR xmlfile,
    [in] LPCWSTR runasuser,
    [in] LPCWSTR runaspassword);

---

QueryClusterTriggerable task( ) function

---

HRESULT QueryClusterTriggerable task( [in] LPCWSTR cluster-name,
    [in] LPCWSTR triggerable taskname, // one triggerable task if specified.
Otherwise, all triggerable tasks.
    [in] EnumQueryType, // name and status only, or xml; name only if not specified.

```
[out, optional] INT triggerable taskCount,
[out, optional] LPWSTR* triggerable taskNames,
[out, optional] LPWSTR* xmlfile);
```

DeleteClusterTriggerable task( ) function

```
HRESULT DeleteClusterTriggerable task([in] LPCWSTR server-name,
    [in] LPCWSTR triggerable taskname,
    [in] BOOL force
);
```

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
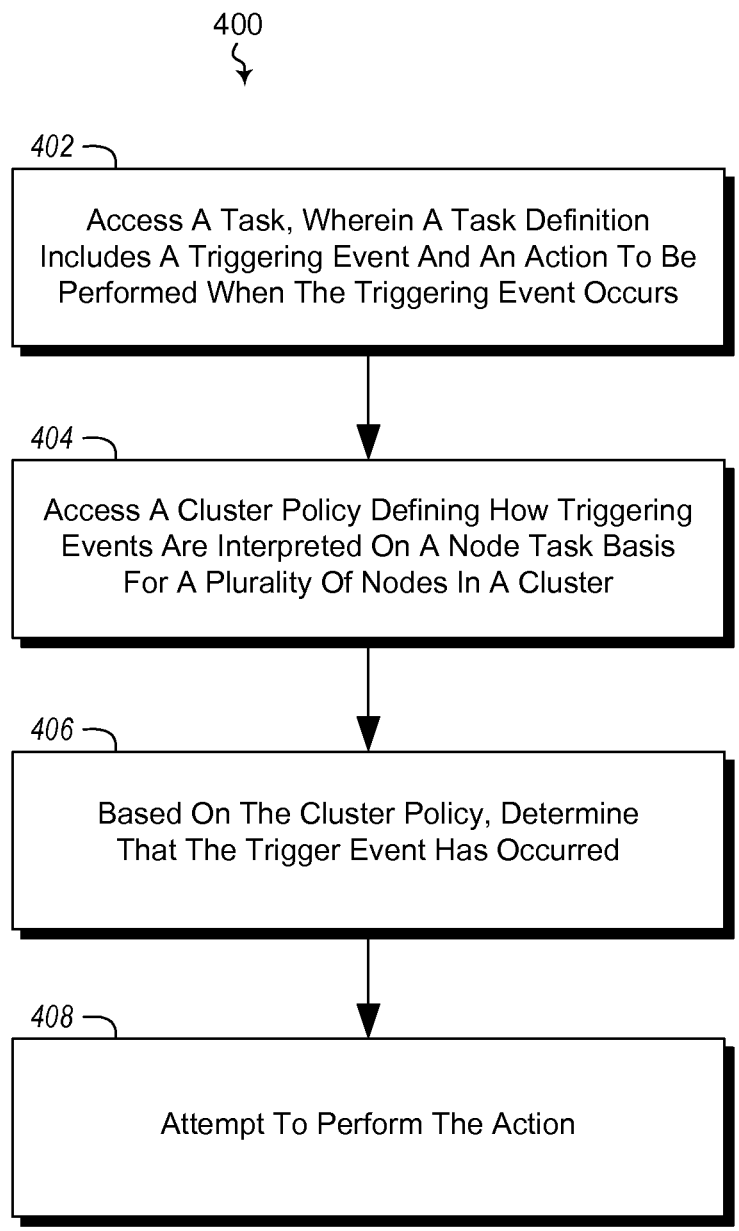
FIG. 4 illustrates a method for managing triggerable tasks in a cluster environment.

Referring now to FIG. 4, a method 400 is illustrated. The method 400 includes acts for managing a triggerable task in a cluster environment. The method 400 includes accessing a definition a task, wherein the definition includes a triggering event, and one or more actions to be performed when the triggering event occurs (act 402). For example, a triggerable task may include actions that are performed at a particular time, after a particular interval, at start-up at shut down of a cluster service, after a particular event, etc. Some example events may be storage failure events, network hardware failure events, low storage capacity events, etc.

The method 400 further includes accessing a cluster policy defining how triggering events are interpreted on a node task basis for a plurality of nodes in a cluster (act 404). For example, the cluster policy may specify that the task is run on only one node in the cluster, run on every node in the cluster, run only on nodes running a particular application, run in the cluster until the task succeeds, run at least once, run at most once, etc.

Based on the cluster policy, the method 400 further includes determining that the trigger event has occurred (act 406). For example, a determination can be made that a certain clock time has been reached, or that an interval has expired, or that an event has occurred.

The method 400 further includes, as a result of determining that the trigger event has occurred, attempting to perform the one or more actions (act 408).

The method 400 may further include various recovery options. For example, some embodiments may include functionality for attempting to perform the actions until they are performed successfully. State of the task may be stored so that actions of the task that have been completed do not need to be repeated. In some embodiments, recovery options may attempt a different node in a cluster to attempt to perform actions if the actions fail on a node. When the task is tied to an application (i.e., the actions are intended to be performed on a node running a particular application), in some embodiments, recovery options may attempt a different node in a cluster to run any applications tied to the task and attempt to perform actions if the actions fail on a node.

The method 400 may further include adding policy information that indicates tasks to be performed to nodes added to the cluster. The policy can apply to a node as soon as it is added to the cluster even though the task was defined before the node joined cluster. Further, embodiments may include functionality for causing cluster policy to no longer apply to nodes that leave the cluster.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment in which a plurality of computing systems are running as nodes in one or more clusters, a computer-implemented method of managing within a node architecture how triggerable tasks are performed in each of the one or more clusters with respect to the nodes in each of the one or more clusters, the computer-implemented method comprising:
   at two or more of the nodes in a cluster of the one or more clusters, instantiating a node architecture at each of the two or more nodes which includes:
      a cluster service component comprising a module for creating, deleting and updating cluster tasks;
      a cluster database storing cluster task properties;
      a task scheduler component that schedules the cluster tasks to be performed; and
      a task scheduler database storing general properties and status data for each of the cluster tasks created by the cluster service component;
   at the cluster service component of a first node of the two or more nodes in the cluster, creating a definition of one or more triggerable cluster tasks that includes i) a triggering event, and ii) one or more actions to be performed when the triggering event occurs;
   at the cluster service component of the first node, creating a cluster policy defining i) how each of the one or more created triggerable cluster tasks is deployed on one of the two or more nodes of the cluster, and ii) under what conditions each of the one or more created triggerable cluster tasks is to be initiated and completed by the one of the two or more nodes in the cluster;
   storing each of the one or more created triggerable cluster tasks in the cluster database at the first node where the one or more triggerable cluster tasks are created;
   synchronizing the cluster database of one or more other nodes in the cluster with the cluster database at the first node where the one or more triggerable cluster tasks were created;
   for each of the one or more other nodes in the cluster having a cluster database that was synchronized, notifying the cluster service component of the one or more other nodes that the cluster database for the one or more other nodes now includes the one or more triggerable cluster tasks created at the first node; and
   based on the cluster policy and the triggering event defined for each of the one or more triggerable cluster tasks, deploying one of the one or more of the created triggerable cluster tasks at one of the two or more nodes of the cluster for execution in accordance with the triggering event and the cluster policy.

2. The method of claim 1, wherein the triggering event comprises at least one of cluster service start-up or shut-down.

3. The method of claim 1, wherein the triggering event comprises at least one of a network connection failure, SAN connectivity failure, storage corruption, low storage capacity, specific time of day, or expiration of pre-determined period of time.

4. The method of claim 1, wherein the cluster policy defines that one or more of the one or more actions should be run on at least one of: only one node of the cluster, every node of the cluster, or nodes of the cluster running a particular application.

5. The method of claim 1, wherein the cluster policy defines that one or more of the one or more actions should be run at least once or run at most once.

6. The method of claim 1, further comprising storing triggerable cluster task state if the one or more actions are not completely performed.

7. The method of claim 1, further comprising attempting to perform the one or more actions until the one or more actions are performed successfully.

8. The method of claim 1, further comprising only attempting to perform one or more of the one or more actions at most once no matter whether the actions are successful or not.

9. The method of claim 1, further comprising attempting to perform one or more of the one or more actions on a different node of the cluster if actions fail on another node of the cluster.

10. The method of claim 1, further comprising attempting to perform one or more of the one or more actions and placing an application tied to the one or more triggerable cluster tasks on a different node of the cluster if actions fail on another node of the cluster.

11. The method of claim 1, wherein the cluster policy is added to one or more nodes added to the cluster even though the one or more triggerable cluster tasks were created at the first node before the one or more nodes were added to the cluster.

12. The method of claim 1, wherein the cluster policy is removed from one or more nodes removed from the cluster.

13. In a computing environment in which a plurality of computing systems are running as nodes in one or more clusters, one or more computer hardware memory devices which contain computer-executable instructions for a computer-implemented method of managing within a node architecture how triggerable tasks are performed in each of the one or more clusters with respect to the nodes in each of the one or more clusters, the computer-implemented method comprising:

at two or more of the nodes in a cluster of the one or more clusters, instantiating a node architecture at each of the two or more nodes which includes:
- a cluster service component comprising a module for creating, deleting and updating cluster tasks;
- a cluster database storing cluster task properties;
- a task scheduler component that schedules the cluster tasks to be performed; and
- a task scheduler database storing general properties and status data for each of the cluster tasks created by the cluster service component;

at the cluster service component of a first node of the two or more nodes in the cluster, creating a definition of one or more triggerable cluster tasks that includes i) a triggering event, and ii) one or more actions to be performed when the triggering event occurs;

at the cluster service component of the first node, creating a cluster policy defining i) how each of the one or more created triggerable cluster tasks is deployed on one of the two or more nodes of the cluster, and ii) under what conditions each of the one or more created triggerable cluster tasks is to be initiated and completed by the one of the two or more nodes in the cluster;

storing each of the one or more created triggerable cluster tasks in the cluster database at the first node where the one or more triggerable cluster tasks are created;

synchronizing the cluster database of one or more other nodes in the cluster with the cluster database at the first node where the one or more triggerable cluster tasks were created;

for each of the one or more other nodes in the cluster having a cluster database that was synchronized, notifying the cluster service component of the one or more other nodes that the cluster database for the one or more other nodes now includes the one or more triggerable cluster tasks created at the first node; and based on the cluster policy and the triggering event defined for each of the one or more triggerable cluster tasks, deploying one of the one or more of the created triggerable cluster tasks at one of the two or more nodes of the cluster for execution in accordance with the triggering event and the cluster policy.

14. The one or more computer hardware memory devices of claim 13, wherein the cluster policy defines that one or more of the actions should be run on at least one of: only one node of the cluster, every node of the cluster, or nodes of the cluster running a particular application.

15. The one or more computer hardware memory devices of claim 13, wherein the cluster policy defines that one or more of the one or more actions should be run at least once or run at most once.

16. The one or more computer hardware memory devices of claim 13, further comprising attempting to perform the one or more actions until the one or more actions are performed successfully.

17. The one or more computer hardware memory devices of claim 13, further comprising only attempting to perform one or more of the one or more actions once no matter whether the actions are successful or not.

18. The one or more computer hardware memory devices of claim 13, further comprising attempting to perform one or more of the one or more actions on a different node of the cluster if actions fail on another node of the cluster.

19. The one or more computer hardware memory devices of claim 13, further comprising attempting to perform one or more of the one or more actions and placing an application tied to the task on a different node of the cluster if actions fail on node of the cluster.

20. A computing network system in which a plurality of computing systems are running as nodes in one or more clusters, comprising:
- one or more processors at each node;
- a node architecture at each node which includes:
  - a cluster service component comprising a module for creating, deleting and updating cluster tasks;
  - a cluster database storing cluster task properties;
  - a task scheduler component that schedules the cluster tasks to be performed; and
  - a task scheduler database storing general properties and status data for each of the created cluster tasks created by the cluster service component; and
- one or more computer hardware memory devices which contain computer-executable instructions for a computer-implemented method of managing within the node architecture how triggerable tasks are performed in each of the one or more clusters with respect to the nodes in each of the one or more clusters, the computer-implemented method comprising:
  - at the cluster service component of a first node of a cluster of the one or more clusters, creating a definition of one or more triggerable cluster tasks that includes i) a triggering event, and ii) one or more actions to be performed when the triggering event occurs;
  - at the cluster service component of the first node, creating a cluster policy defining i) how each of the one or more created triggerable cluster tasks is deployed on one or more nodes of the cluster, and ii) under what conditions each of the one or more created triggerable cluster tasks is to be initiated and completed by the one or more nodes in the cluster;
  - storing each of the one or more created triggerable cluster tasks in the cluster database at the first node where the one or more triggerable cluster tasks are created;
  - synchronizing the cluster database of one or more other nodes in the cluster with the cluster database at the first node where the one or more triggerable cluster tasks were created;
  - for each of the one or more other nodes in the cluster having a cluster database that was synchronized, notifying the cluster service component of the one or more other nodes that the cluster database for the one or more other nodes now includes the one or more triggerable cluster tasks created at the first node; and
  - based on the cluster policy and the triggering event defined for each triggerable cluster task, deploying one of the one or more of the created triggerable cluster tasks at one or more nodes of the cluster for execution in accordance with the triggering event and the cluster policy.

* * * * *